United States Patent
Sawada et al.

(10) Patent No.: US 11,080,980 B2
(45) Date of Patent: *Aug. 3, 2021

(54) RESCUE SYSTEM AND RESCUE METHOD, AND SERVER USED FOR RESCUE SYSTEM AND RESCUE METHOD

(71) Applicant: TOYOTA JIDOSHA KABUSHIKI KAISHA, Toyota (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/189,092

(22) Filed: Nov. 13, 2018

(65) Prior Publication Data

US 2019/0147723 A1 May 16, 2019

(30) Foreign Application Priority Data

Nov. 13, 2017 (JP) .............................. JP2017-218371

(51) Int. Cl.
G08B 23/00 (2006.01)
G08B 21/04 (2006.01)
G08B 27/00 (2006.01)

(52) U.S. Cl.
CPC ..... *G08B 21/0492* (2013.01); *G08B 21/0423* (2013.01); *G08B 21/0476* (2013.01); *G08B 27/001* (2013.01)

(58) Field of Classification Search
CPC ............ G08B 21/0492; G08B 21/0423; G08B 21/0476; G08B 27/001
(Continued)

(56) References Cited

U.S. PATENT DOCUMENTS 7,916,066 B1 3/2011 Osterweil
8,086,351 B2 * 12/2011 Gaudiano .............. G01C 11/00
700/253

(Continued)

FOREIGN PATENT DOCUMENTS

CN 1798335 A 7/2006
CN 102754436 A 10/2012
(Continued)

OTHER PUBLICATIONS

United States Patent and Trademark Office, Final Office Action issued to U.S. Appl. No. 16/188,752 dated Feb. 6, 2020, 20 pages.
(Continued)

*Primary Examiner* — Kerri L McNally
*Assistant Examiner* — Thang D Tran
(74) *Attorney, Agent, or Firm* — Hunton Andrews Kurth LLP

(57) ABSTRACT

A rescue system includes: a plurality of movable bodies each equipped with a camera; and a server configured to communicate with the plurality of movable bodies. The rescue system identifies a protection target, based on information acquired by the camera. The server is configured to (a) define a search area to be searched for the protection target, (b) acquire positional information about the plurality of movable bodies and select, from movable bodies located within the search area, at least one movable body to be used for searching for the protection target, the movable body being selected as a selected movable body, and (c) output, to the selected movable body, a search command for searching for the protection target.

16 Claims, 6 Drawing Sheets

(58) Field of Classification Search
USPC .................................................. 340/573, 400
See application file for complete search history.

(56) References Cited

U.S. PATENT DOCUMENTS

| | | | |
|---|---|---|---|
| 9,471,059 B1 | 10/2016 | Wilkins | |
| 9,481,367 B1 | 11/2016 | Gordon et al. | |
| 9,648,107 B1 | 5/2017 | Penilla et al. | |
| 9,804,596 B1 | 10/2017 | Slavin | |
| 9,826,415 B1* | 11/2017 | Byrne | H04W 8/005 |
| 10,155,587 B1* | 12/2018 | Tang | B64C 27/08 |
| 10,395,332 B1* | 8/2019 | Konrardy | G06F 16/90335 |
| 2002/0156646 A1* | 10/2002 | Kaiwa | G06Q 30/0261 455/456.5 |
| 2004/0233414 A1* | 11/2004 | Jamieson | G01S 7/4802 356/4.01 |
| 2006/0066723 A1 | 3/2006 | Iwase et al. | |
| 2006/0152592 A1 | 7/2006 | Chishima et al. | |
| 2006/0184323 A1* | 8/2006 | Park | G01C 21/36 701/431 |
| 2006/0187027 A1* | 8/2006 | Smith | G08G 1/207 340/539.13 |
| 2007/0205937 A1* | 9/2007 | Thompson | G01S 7/414 342/22 |
| 2008/0077322 A1* | 3/2008 | Sumizawa | G06K 9/00798 701/448 |
| 2009/0204600 A1* | 8/2009 | Kalik | G01C 21/30 |
| 2010/0198514 A1* | 8/2010 | Miralles | B64C 39/00 701/302 |
| 2010/0262367 A1* | 10/2010 | Riggins | G01C 21/26 701/533 |
| 2011/0066368 A1* | 3/2011 | Koyasu | G01C 21/3679 701/533 |
| 2012/0316768 A1* | 12/2012 | Haran | G08G 1/168 701/300 |
| 2013/0002869 A1 | 1/2013 | Yuasa et al. | |
| 2013/0178185 A1* | 7/2013 | Park | H04W 4/90 455/404.2 |
| 2013/0194421 A1* | 8/2013 | Kita | H04N 7/18 348/143 |
| 2013/0217332 A1* | 8/2013 | Altman | H04W 12/04 455/41.2 |
| 2014/0108377 A1 | 4/2014 | West | |
| 2014/0111332 A1* | 4/2014 | Przybylko | G06Q 10/00 340/539.1 |
| 2014/0133656 A1* | 5/2014 | Wurster | H04W 12/08 380/270 |
| 2014/0167954 A1* | 6/2014 | Johnson | H04W 4/029 340/539.11 |
| 2014/0309866 A1 | 10/2014 | Ricci | |
| 2014/0353422 A1* | 12/2014 | Westbrook, Sr. | B64D 47/08 244/17.21 |
| 2015/0066248 A1* | 3/2015 | Arbeit | G01C 23/00 701/2 |
| 2015/0194034 A1* | 7/2015 | Shim | G08B 21/0476 348/77 |
| 2016/0340006 A1* | 11/2016 | Tang | B64C 39/024 |
| 2017/0034682 A1* | 2/2017 | Matsumasa | G08B 27/00 |
| 2017/0041743 A1* | 2/2017 | Artzt | H04W 4/80 |
| 2017/0092109 A1* | 3/2017 | Trundle | G08B 25/006 |
| 2017/0131727 A1* | 5/2017 | Kurdi | G06Q 50/00 |
| 2017/0191843 A1* | 7/2017 | Yadav | G01C 21/3407 |
| 2017/0202180 A1 | 7/2017 | Yang | |
| 2017/0249846 A1* | 8/2017 | Ignaczak | H04L 67/00 |
| 2017/0301109 A1* | 10/2017 | Chan | G06K 9/0063 |
| 2017/0337791 A1 | 11/2017 | Gordon-Carroll | |
| 2017/0364733 A1* | 12/2017 | Estrada | G06N 3/08 |
| 2018/0039262 A1* | 2/2018 | Fox | G01S 19/51 |
| 2018/0050800 A1* | 2/2018 | Boykin | H04R 29/00 |
| 2018/0068546 A1 | 3/2018 | Fujimoto | |
| 2018/0082560 A1* | 3/2018 | Gillum | B64C 39/024 |
| 2018/0096579 A1* | 4/2018 | Komatsu | G08B 21/0423 |
| 2018/0128894 A1* | 5/2018 | Kaio | H04B 17/00 |
| 2018/0249127 A1* | 8/2018 | Sielski | H04N 5/247 |
| 2018/0300964 A1* | 10/2018 | Lakshamanan | G06N 20/10 |
| 2018/0357247 A1 | 12/2018 | Siminoff et al. | |
| 2019/0057252 A1* | 2/2019 | Ichihara | G06K 9/0063 |
| 2019/0086914 A1* | 3/2019 | Yen | G05D 1/0022 |
| 2019/0147252 A1 | 5/2019 | Sawada et al. | |

FOREIGN PATENT DOCUMENTS

| | | |
|---|---|---|
| CN | 103426211 A | 12/2013 |
| CN | 103956059 A | 7/2014 |
| CN | 106796748 A | 5/2017 |
| CN | 107170195 A | 9/2017 |
| CN | 107230310 A | 10/2017 |
| CN | 207218924 U | 4/2018 |
| JP | H09-220266 A | 8/1997 |
| JP | 2000099971 A | 4/2000 |
| JP | 2003109156 A | 4/2003 |
| JP | 2005038299 A | 2/2005 |
| JP | 2005-092727 A | 4/2005 |
| JP | 2006086591 A | 3/2006 |
| JP | 2009064222 A | 3/2009 |
| JP | 2012139182 A | 7/2012 |
| JP | 2013-157019 A | 8/2013 |
| JP | 2015-111906 A | 6/2015 |
| JP | 2016036123 A | 3/2016 |
| JP | 2016119625 A | 6/2016 |
| JP | 2016-218865 A | 12/2016 |
| JP | 2017027107 A | 2/2017 |
| JP | 2017126967 A | 7/2017 |
| JP | 2017163511 A | 9/2017 |
| JP | 2019091161 A | 6/2019 |
| KR | 20160026437 A | 3/2016 |
| SG | 195504 A1 | 12/2013 |
| WO | 2016132492 A1 | 8/2016 |
| WO | 2016162899 A1 | 10/2016 |
| WO | 2017119505 A1 | 7/2017 |
| WO | 2017154595 A1 | 9/2017 |
| WO | 2017159680 A1 | 9/2017 |

OTHER PUBLICATIONS

United States Patent and Trademark Office, Final Office Action issued to U.S. Appl. No. 16/189,395 dated Feb. 6, 2020, 17 pages.
United States Patent and Trademark Office, Non-Final Office Action issued to U.S. Appl. No. 16/188,635 dated Jan. 3, 2020, 24 pages.
United States Patent and Trademark Office, Non-Final Office Action issued to U.S. Appl. No. 16/188,635 dated Jun. 27, 2019, 13 pages.
United States Patent and Trademark Office, Non-Final Office Action issued to U.S. Appl. No. 16/188,752 dated Jul. 29, 2019, 8 pages.
United States Patent and Trademark Office, Non-Final Office Action issued to U.S. Appl. No. 16/189,395 dated Jul. 29, 2019, 5 pages.
United States Patent and Trademark Office, Advisory Action issued to U.S. Appl. No. 16/189,395 dated May 7, 2020, 14 pages.
United States Patent and Trademark Office, Advisory Action issued to U.S. Appl. No. 16/188,752 dated May 7, 2020, 14 pages.
United States Patent and Trademark Office, Non-Final Office Action issued to 16/188,752 dated Jul. 9, 2020, 17 pages.
United States Patent and Trademark Office, Non-Final Office Action issued to 16/189,395 dated Jul. 9, 2020, 17 pages.
United States Patent and Trademark Office, Notice of Allowance issued to 16/188,635 dated Jul. 23, 2020, 12 pages.
United States Patent and Trademark Office, Non-Final Office Action issued to 16/188,635 dated Jul. 23, 2020, 12 pages.
United States Patent and Trademark Office, Final Office Action issued in U.S. Appl. No. 16/188,752 dated Oct. 6, 2020, 34 pages.
United States Patent and Trademark Office, Final Office Action issued in U.S. Appl. No. 16/189,395 dated Oct. 7, 2020, 21 pages.
Non-Final Office Action, United States Patent and Trademark Office, issued to U.S. Appl. No. 16/188,752 dated Apr. 29, 2021, 18 pages.
Non-Final Office Action, United States Patent and Trademark Office, issued to U.S. Appl. No. 16/189,395 dated Apr. 29, 2021, 14 pages.

* cited by examiner

RESCUE SYSTEM AND RESCUE METHOD, AND SERVER USED FOR RESCUE SYSTEM AND RESCUE METHOD This nonprovisional application is based on Japanese Patent Application No. 2017-218371 filed on Nov. 13, 2017 with the Japan Patent Office, the entire contents of which are hereby incorporated by reference.

BACKGROUND

Field

The present disclosure relates to a rescue system and a rescue method as well as a server used for the rescue system and the rescue method, and more particularly relates to a system using a vehicle to detect a person to be protected (protection target) who is absent without leave, so as to protect the person.

Description of the Background Art

Recently, with the aging of the society, the number of elderly people suffering from diseases and symptoms such as dementia has been increasing. Dementia patients who are cared for at home may leave home without permission while the caregiver is absent to eventually go missing or suffer an accident, for example.

A system for searching for such an elderly person or lost child for example has been known. For example, Japanese Patent Laying-Open No. 2015-111906 discloses a search system for determining whether a person whose image is captured by a camera is a search target, based on images and/or video captured by a plurality of cameras connected to a network such as monitoring cameras installed on streets and moving cameras mounted on movable bodies like vehicles, and also based on text information derived from a name tag or the like shown on the images.

Japanese Patent Laying-Open No. 2016-218865 discloses a rescue system for identifying a user such as dementia patient based on a serial number on an accessory worn by the user. The serial number is read by a smart phone or the like of a finder of the user and transmitted to a data management company from the smart phone.

SUMMARY

The technique disclosed in above-referenced Japanese Patent Laying-Open No. 2015-111906 conducts a search using cameras installed across a large area. Based on positional information about a camera transmitted together with image information captured by the camera, the identified search target is located. As for the moving cameras mounted on movable bodies such as vehicles, however, the movable body may go out of an area to be searched, resulting in the possibility that the search system loses sight of the search target during the search or becomes unable to search for the target.

The present disclosure is given to provide solutions to the above problems. An object of the present disclosure is to efficiently search for a person to be protected (hereinafter referred to as "protection target"), by a system for identifying the protection target based on information from a detection device mounted on a movable body, so as to rescue the protection target.

A rescue system according to the present disclosure is a rescue system for identifying and rescuing a protection target, using information from a detection device. The rescue system includes: a plurality of movable bodies each equipped with the detection device; and a server configured to communicate with the plurality of movable bodies. The server is configured to (a) define a search area to be searched for the protection target, (b) acquire positional information about the plurality of movable bodies and select, from movable bodies located within the search area, at least one movable body to be used for searching for the protection target, the movable body being selected as a selected movable body, and (c) output, to the selected movable body, a search command for searching for the protection target.

When the rescue system in the present disclosure searches for a protection target, the server first defines a search area to be searched for the protection target, selects a movable body from movable bodies (vehicles, for example) located within the defined search area, so as to use the selected movable body for collecting information for the search. A command to search is then output to the selected movable body. In this way, the search for the protection target is conducted based on information from the movable body at an appropriate position within an appropriate search area defined based on a usual range of activities of the protection target. Therefore, even when the camera position moves with movement of the vehicle, the system will not lose sight of the protection target, and the search for the protection target can be conducted efficiently. Moreover, information is limited to information from vehicles within the specific search area. It is therefore possible to limit the amount of communication between the vehicles and the server and suppress increase of the amount of information processing by the server.

When receiving the search command, the selected movable body transmits to the server information acquired from the detection device. The server identifies the protection target, based on the information transmitted from the selected movable body.

In the system thus configured, information acquired by a movable body is transmitted to the server and the server identifies the protection target. Generally, the server stores more information and has a controller of a higher throughput than the movable body. The server therefore identifies the protection target to thereby enable accurate identification of the protection target.

The detection device is a camera. The server identifies the protection target, using an image captured by the camera and transmitted from the selected movable body.

The server uses a characteristic of a candidate included in the image captured by the camera to identify the candidate as the protection target. The characteristic includes text information about the candidate, and clothing, belonging, and behavioral pattern of the candidate.

In the system thus configured, the protection target can be identified based on an image from a camera mounted on a movable body as a detection device.

The protection target has a belonging with ID information. The detection device is a sensor configured to read the ID information. The server uses the ID information transmitted from the selected movable body to identify the protection target.

In the system thus configured, the server can identify the protection target, based on the ID information of the belonging of the protection target.

The server transmits to the selected movable body information for identifying the protection target. The selected movable body compares information acquired from the detection device with the information transmitted from the server to identify the protection target, and transmits, to the server, detection information of the protection target.

In the system thus configured, the movable body can perform a part of the process performed for identifying the protection target. Accordingly, transmission/reception of information between the movable bodies and the server and the processing load on the server can be reduced.

Search for the protection target is performed in response to a request from a requester. When the protection target is identified, the server provides the requester with a notification that the protection target has been found.

The system configured in this way can immediately inform the requestor of the fact that the protection target has been found.

When the protection target is identified, the server outputs, to the selected movable body, a command to watch the protection target.

In the system configured in this way, when the protection target is identified, the movable body can keep tracking the protection target. Thus, the system can be prevented from losing sight of the found protection target.

When the protection target is identified, the server makes a rescue request, to a rescue group, to rescue the protection target.

In the system configured in this way, even when the requester cannot immediately rush to the location where the protection target is found, a person in charge belonging to the rescue group can protect the protection target.

The server uses information from the selected movable body to determine a protection level for the protection target. When the protection level is larger than a threshold value, the server makes the rescue request to the rescue group. The protection level is determined in accordance with at least one of a location where the protection target is detected, a time when the protection target is detected, weather when the protection target is detected, and a condition of the protection target when the protection target is detected.

When a location where the protection target is detected is out of a predetermined range, the server makes the rescue request to the rescue group.

When the server makes the rescue request to the rescue group, the server provides the rescue group with a notification of positional information about the protection target. In response to the rescue request from the server, the rescue group dispatches a person in charge to a location indicated by the positional information.

When the requester makes a request to rescue after receiving the notification, the server makes a rescue request, to a rescue group, to rescue the protection target.

In the system configured in this way, it is determined whether to make a rescue request to the rescue group, in accordance with the protection level determined in accordance with the environment of the protection target and the condition of the protection target when the protection target is found, and a request from the requester. In some cases, the identified protection target may perform an ordinary activity such as walking or shopping, and such a protection target requires no rescue. Whether to make a rescue request to a rescue group is determined in accordance with the protection level which is determined based on detected information. Accordingly, unnecessary requests to rescue can be suppressed.

A server according to another aspect of the present disclosure is a server used for a rescue system for identifying and rescuing a protection target. The server is configured to (a) define a search area to be searched for a protection target, (b) acquire positional information about a plurality of movable bodies and select, from movable bodies located within the search area, at least one movable body to be used for searching for the protection target, the movable body being selected as a selected movable body, and (c) output, to the selected movable body, a search command for searching for the protection target.

A method according to still another aspect of the present disclosure is a rescue method for identifying and rescuing a protection target, in a system including: a plurality of movable bodies each equipped with a detection device; and a server configured to communicate with the plurality of movable bodies. The method includes, by the server: (a) defining a search area to be searched for the protection target; (b) acquiring positional information about the plurality of movable bodies; (c) selecting, from movable bodies located within the search area, at least one movable body to be used for searching for the protection target, the movable body being selected as a selected movable body; and (d) outputting, to the selected movable body, a search command for searching for the protection target.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
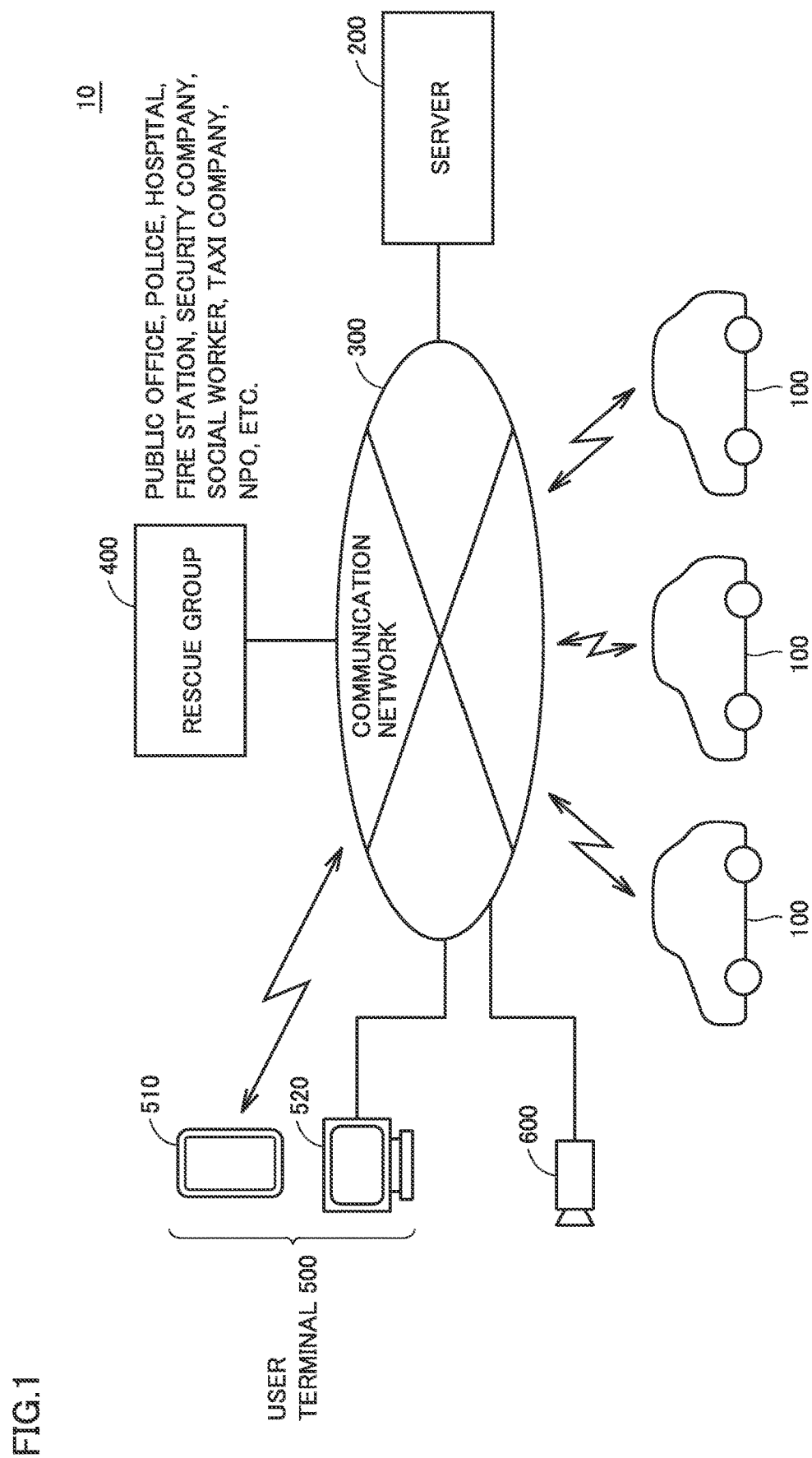
FIG. 1 is a schematic diagram of an overall configuration of a rescue system according to the present embodiment.

In the following, embodiments of the present disclosure are described in detail with reference to the drawings. In the drawings, the same or corresponding elements are denoted by the same reference characters, and a description thereof is not repeated.

First Embodiment

<System Overview>

FIG. 1 is a schematic diagram of an overall configuration of a rescue system 10 according to the present embodiment. Referring to FIG. 1, rescue system 10 includes a plurality of movable bodies 100 and a server 200 configured to communicate with movable bodies 100. Rescue system 10 searches for a target person (also referred to as "protection target" hereinafter) at the request of a user, based on information acquired from movable bodies 100.

Regarding the present embodiment, an example is described in which a vehicle is used as movable body 100, and movable body 100 is also referred to simply as "vehicle 100" hereinafter. Vehicle 100 includes automobile, motorcycle, bicycle, and the like.

Vehicle 100 and server 200 are configured to transmit/receive information to/from each other through a communication network 300 such as the Internet or telephone line, for example. Vehicle 100 and server 200 may directly communicate with each other without communication network 300.

A requester requests server 200 to search for a target person, by manipulating a user terminal 500 such as a mobile terminal 510 like smart phone or a personal computer 520 at the requester's home. Server 200 receiving the request acquires information from cameras and/or a variety of sensors mounted on vehicles 100 or a stationary camera 600 installed on a street or shop, and identifies the protection target, using the acquired information.

After identifying the protection target, server 200 requests a rescue group 400 to protect the protection target as required. Rescue group 400 includes, for example, a public office such as city office or municipal office, a police, a fire station, a security company, an NPO (Non-Profitable Organization), and a public transportation facility such as taxi company, or local social worker. Alternatively, rescue group 400 may be a vehicle or a shop located around the location where the protection target is detected. Rescue group 400 receiving the request temporarily accepts the protection target until a protector arrives, or sends the protection target to the protection target's home.

<Configuration of Vehicle and Server>

Figure 2:
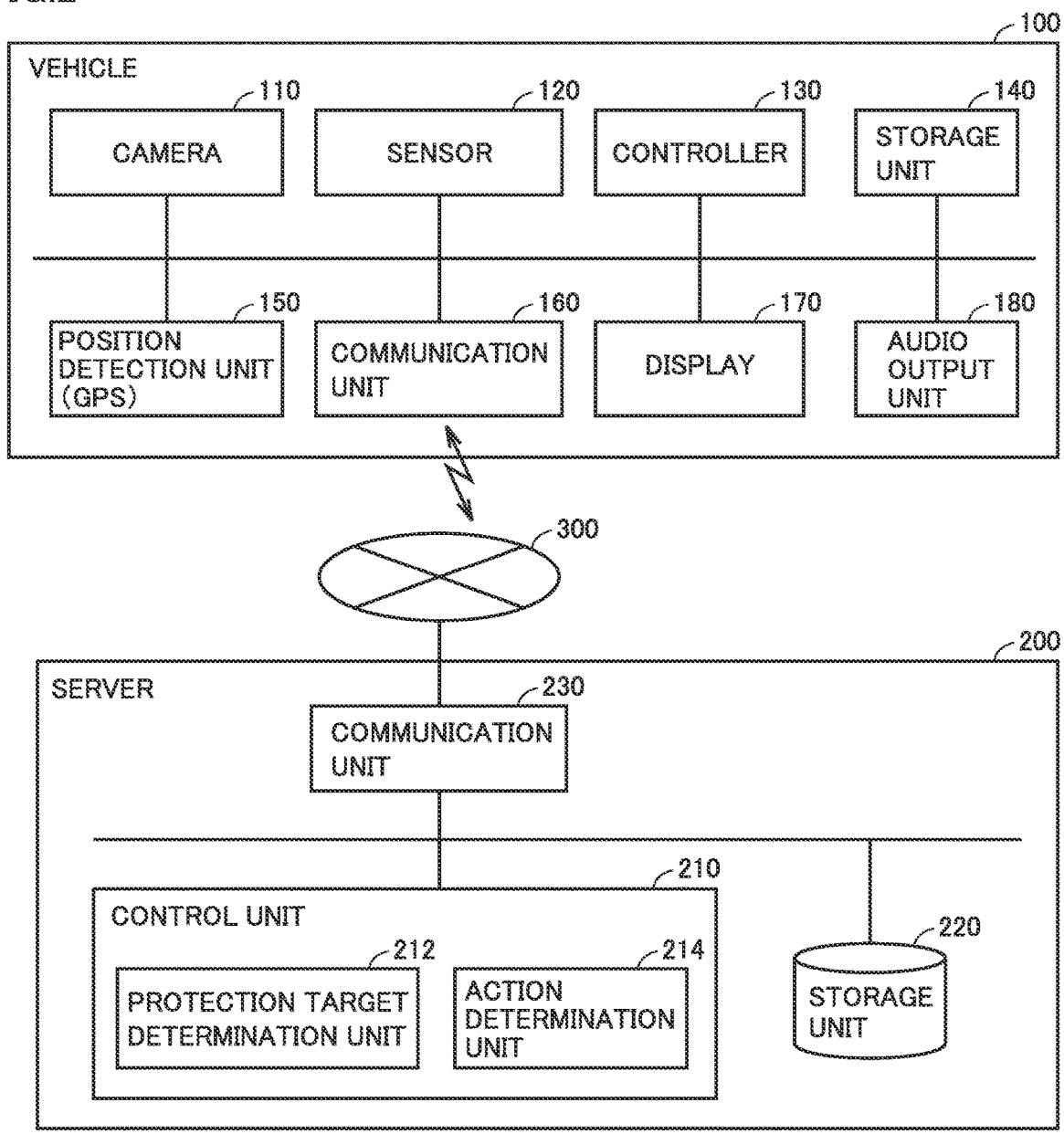
FIG. 2 is a block diagram for illustrating details of a vehicle and a server in FIG. 1.

FIG. 2 is a block diagram for illustrating details of vehicle 100 and server 200 in FIG. 1. Referring to FIG. 2, vehicle 100 includes a camera 110, a sensor 120, a controller 130, a storage unit 140, a position detection unit 150, a communication unit 160, a display 170, and an audio output unit 180.

Communication unit 160 is a communication interface between vehicle 100 and communication network 300. Vehicle 100 transmits/receives information to/from server 200 through communication unit 160.

Camera 110 is a CCD (Charge Coupled Device) camera, for example, and attached to a front portion and/or a rear portion of vehicle 100. Camera 110 is mounted as a part of a drive recorder for recording images and/or video when vehicle 100 suffers an accident or the like, for example. The images captured by camera 110 are transmitted to server 200 through communication unit 160. The images are captured by camera 110 not only during running of vehicle 100 but also during parking of vehicle 100 at a parking area or the like.

Sensor 120 is a receiver for wirelessly detecting information stored on an ID tag or the like, or a reader for reading information from a barcode or QR Code® (two-dimensional barcode), for example. The information acquired by sensor 120 is transmitted to server 200 through communication unit 160 and used for identifying a protection target. Camera 110 and sensor 120 mentioned above correspond to "detection device" in the present disclosure.

Position detection unit 150 is mounted for example on a navigation device (not shown) to acquire information about the absolute position of the vehicle on which this position detection unit 150 is mounted, by means of the GPS (Global Positioning System). Position detection unit 150 outputs the acquired positional information to server 200.

Display 170 is constructed for example of a liquid crystal panel to display various types of information acquired by vehicle 100 as well as information transmitted from server 200. Display 170 is formed for example in a window of vehicle 100 and configured to provide information to those who are outside the vehicle (protection target, for example). Conversation through audio output unit 180 as well as display 170 like videophone, and communication by answering to a question indicated on display 170 through touch operation are also possible.

Controller 130 includes a CPU (Central Processing Unit), a storage such as memory, and an input/output buffer (they are not shown), to perform overall control of vehicle 100. Receiving from server 200 a command to search for a protection target, controller 130 acquires information from the detection device (camera 110 and/or sensor 120) and transmits the acquired information to server 200. When vehicle 100 is to identify the protection target, controller 130 stores in storage unit 140 information regarding the protection target which is transmitted from server 200, and compares the information acquired from the detection device with the information stored in storage unit 140 to identify the protection target.

Server 200 includes a control unit 210, a storage unit 220, and a communication unit 230. Control unit 210 includes a protection target determination unit 212, and an action determination unit 214.

Communication unit 230 is a communication interface between server 200 and communication network 300. Server 200 transmits/receives information to/from vehicle 100 and rescue group 400 for example through communication unit 230.

Storage unit 220 stores in advance information about characteristics of a protection target for identifying the protection target. The characteristics used for identifying the protection target include text information such as the name, the address, and the phone number of the protection target, image information such as a photograph of the face of the protection target, characteristics of favorite clothing and belongings (hat/cap, gloves, shoes, bag, and the like) often worn by the protection target, or information about characteristic behavioral patterns of the protection target such as the manner of walking and body language.

Protection target determination unit 212 included in control unit 210 receives image information acquired by camera 110 of vehicle 100 and/or information acquired by sensor 120. Protection target determination unit 212 analyzes the image information from camera 110 to detect characteristics of the face, clothing, and belongings of any person (candidate) included in the image and extract text information included in the image. Protection target determination unit 212 compares these pieces of information with the information stored in storage unit 140 to determine whether the candidate included in the image is the protection target who is being searched for by request. Protection target determination unit 212 may also compare the ID information extracted by sensor 120 with the information stored in storage unit 140 to identify the protection target. It may also extract, from the image (video image) from camera 110, behavioral patterns of the candidate by big data analysis, so as to identify the protection target.

Action determination unit 214 determines what action is to be taken, when protection target determination unit 212 identifies the protection target. Specifically, action determination unit 214 determines whether to inform the search requester of the fact that the protection target has been found, and determines whether to make a rescue request to a rescue group, in accordance with standards stored in storage unit 220.

In such a system, the server recognizes and identifies the protection target to be searched for, based on information transmitted from a plurality of vehicles. In order to collect a large amount of information, it is necessary to acquire information from a large number of vehicles distributed across a large area. If information is acquired from an excessively large number of vehicles, however, the amount of information communicated between the server and the vehicles increases and accordingly the processing load on the server increases.

Generally, the usual range of activities of a protection target such as dementia patient is limited to a certain extent. It may be possible to invariably designate vehicles as vehicles from which information is to be collected, in order to limit the amount of information. However, because vehicles are movable, any vehicle going out of the usual range of activities of the protection target could transmit unnecessary information or lose sight of the protection target.

In view of the above, the present embodiment employs the following scheme. Specifically, when a requester makes a request to search for a protection target, a search area is defined in advance for the protection target to be searched for. From among vehicles located within the defined search area, a vehicle from which information is to be collected is determined based on the positional information about the vehicle. According to this scheme, it is possible to use only the information from the vehicle at an appropriate position within the appropriate search area which is determined based on the range of activities of the protection target, so as to recognize and identify the protection target. Even when the vehicle moves and accordingly the camera position moves, the system can be prevented from losing sight of the protection target. Efficient search for the protection target is therefore possible. In addition, because the information is limited to the information from the vehicle within the specified search area, transmission and reception of unnecessary information between vehicles and the server can be suppressed.

<Description of Control Details>

Figure 3:
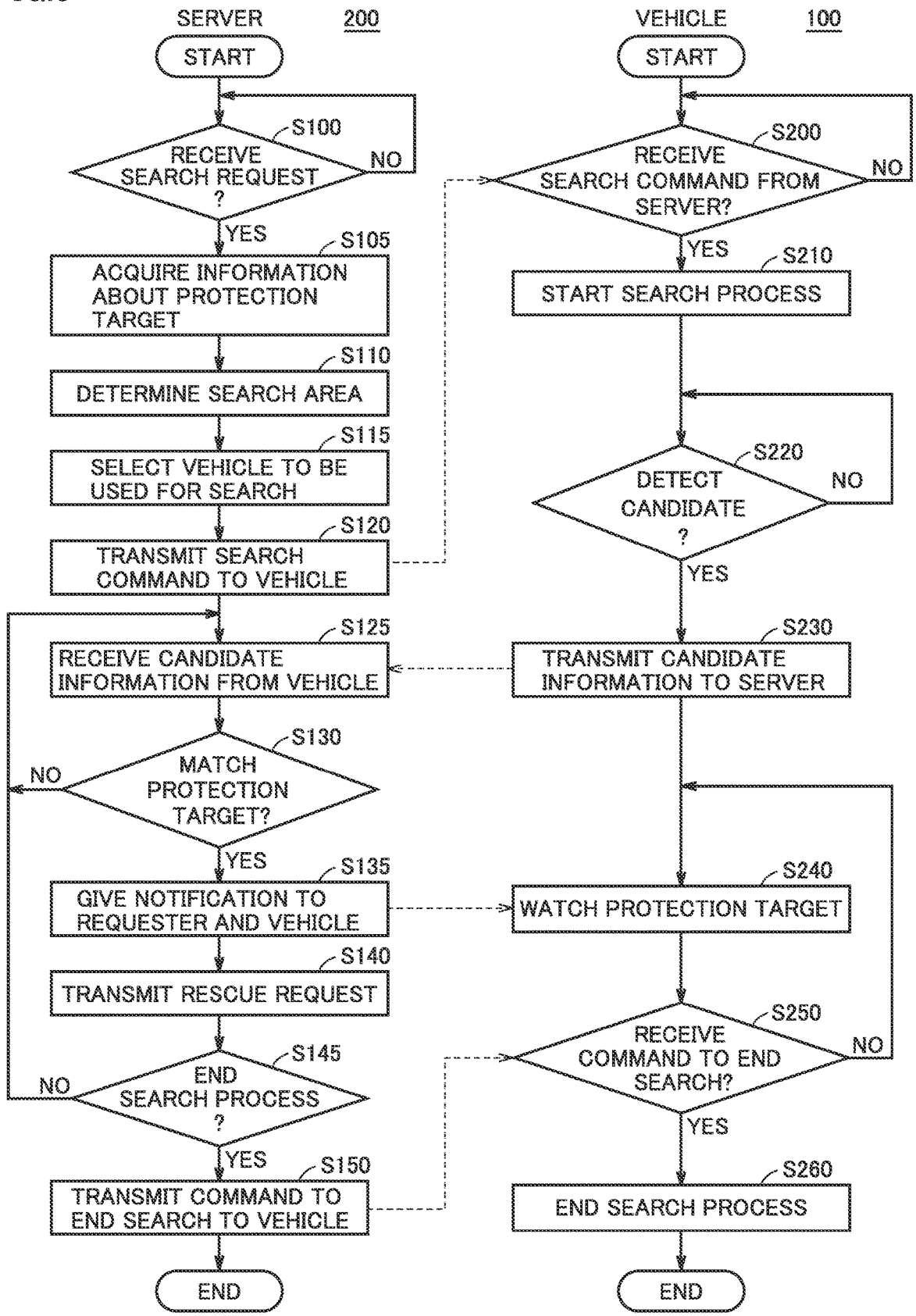
FIG. 3 is a flowchart for illustrating details of control executed by a vehicle and a server for a rescue system according to a first embodiment.

FIG. 3 is a flowchart for illustrating details of control executed by vehicle 100 and server 200 in rescue system 10 according to the first embodiment. Each of the flowcharts shown in FIG. 3 and FIGS. 4 to 6 described later herein is executed by calling a program stored in controller 130 of vehicle 100 and control unit 210 of server 200 from a main routine in a predetermined cycle or when a predetermined condition is met. Alternatively, a part or all of the steps in each flowchart may be performed by dedicated hardware (electronic circuit).

Referring to FIG. 3, a process performed by server 200 is described first. Server 200 determines, in step (hereinafter step is abbreviated as S) 100, whether a request to search for a protection target is made by a requester. When the request to search is not made by a requester (NO in S100), the process returns to S100. When a request to search is made by a requester (YES in S100), the process proceeds to S105 in which server 200 acquires from storage unit 220 information about the protection target to be searched for by request. The information about the protection target is not limited to the information registered in storage unit 220 in advance, but may be information given together with the request made by the requester, such as specific characteristics of clothing and belongings worn by the protection target on the day the request is made, for example.

Acquiring information about the protection target, server 200 proceeds to S110 to define a search area to be searched for the protection target. The search area is preferably defined based on the usual range of activities of the protection target. The search area may be defined based on the address of the protection target, such as an area of 20 km from the protection target's home, for example, or the search area may be within a range designated by the requester.

In S115, server 200 acquires positional information about a plurality of vehicles through communication network 300. From among vehicles located within the defined search area, at least one vehicle is selected (selected movable body) to be used for the search for the protection target. In S115, server 200 outputs a search command to selected vehicle 100 to search for the protection target. Although not shown in the flowchart, if the selected vehicle moves to go out of the search area or a new vehicle enters the search area, the vehicle to be used for search may be changed as appropriate.

Acquiring information about a candidate from selected vehicle 100 to which the search command is output (S125), server 200 determines whether the candidate is identified as the protection target of the requested search, based on the information acquired from vehicle 100 (S130).

When the candidate is not the protection target (NO in S130), the process returns to S125 in which server 200 further acquires information from the aforementioned or another vehicle 100 and further compares the acquired information with the information about the protection target (S130).

When the candidate is the protection target (YES in S130), server 200 informs, in step S135, the requester of the fact that the protection target of the requested search has been found, and informs each vehicle 100 conducting the search of the information about the location where the protection target was found and the latest information about characteristics of the protection target, for example. In response, each vehicle 100 watches the found protection target.

In S140, server 200 transmits a command to protect (request for rescue) to rescue group 400 such as a security company or a police office near the location where the protection target was found. Receiving the request for rescue, the rescue group dispatches a person in charge to the location indicated by the positional information about the protection target transmitted from server 200. In this way, even under situations where the requester cannot immediately rush to the location where the protection target was found, the requester can request the rescue group to rescue the found protection target, so that the protection target may be appropriately protected.

After this, in S145, server 200 determines whether the requester or an administrator of server 200 has instructed server 200 to end the search process. When the instruction to end the search process has not been given (NO in S145), the process proceeds to S125 in which server 200 keeps searching for and watching the protection target. When the instruction to end the search process is given (YES in S145), the process proceeds to S150 in which server 200 transmits to each vehicle a command to end the search. The command to end the search in S150 may be issued based on information indicating that protection of the protection target is completed which is given from rescue group 400.

Next, a process performed by vehicle 100 is described. While FIG. 3 shows the process performed by a single vehicle 100, the following process is performed by each of selected vehicles when server 200 selects these vehicles as vehicles which are to conduct the search.

In S200, vehicle 100 determines whether the vehicle has received from server 200 a command to search for a protection target, i.e., whether the vehicle itself has been selected as a vehicle for searching for the protection target. When the vehicle has not received from server 200 the command to search (NO in S200), the process returns to S200 and the search process is kept on standby until the command to search is given from server 200.

When the vehicle has received the command to search (YES in S200), the process proceeds to S210 in which vehicle 100 starts the search process. As described above with reference to FIG. 2, vehicle 100 determines, based on the information acquired by camera 110 and/or sensor 120, whether a person who is a candidate of the protection target has been detected (S220). According to the first embodiment, server 200 identifies the protection target, and therefore, vehicle 100 determines the candidate based on general characteristics such as the rough size (height) of the detected person, and the color of the clothing and/or the kinds of belongings worn by the person, for example.

When no candidate is detected (NO in S220), the process returns to S220 and vehicle 100 continues the search for a candidate. When the candidate is detected (YES in S220), the process proceeds to S230 in which vehicle 100 transmits to server 200 information acquired by camera 110 and/or sensor 120.

Receiving the information that server 200 has identified the protection target based on the information from vehicle 100, vehicle 100 acquires from server 200, in S240, information about the location where the protection target was detected and information about characteristics of the protection target at the time when the protection target was detected, for example, and watches the protection target based on the acquired information. Watching of the protection target is, for example, tracking of the identified protection target by this vehicle or other vehicles around the former vehicle. Thus, the identified protection target is kept being watched and accordingly the system can be prevented from losing sight of the protection target.

Vehicle 100 thereafter determines, in S250, whether server 200 has transmitted a command to end the search for the protection target. When vehicle 100 has not received the command to end the search (NO in S250), the process returns to S240 in which the watching of the protection target is continued. If the protection target goes out of the field of view of camera 110, for example, the process may return to S220 in which the search for a candidate may be newly performed.

When the vehicle has received the command to end the search (YES in S250), the process proceeds to S260 and vehicle 100 accordingly ends the search process.

Although not shown in FIG. 3, when server 200 could not identify the protection target, vehicle 100 returns the process to S220 to continue the search for another candidate.

Under control performed in accordance with the process as described above, when a requester makes a request to search for a protection target, the command to search is output from the server to a specific vehicle located within the defined search area. In this way, the amount of communication between the vehicles and the server can be limited to a certain extent. It is therefore possible to conduct the search for the protection target while suppressing increase of the amount of information processing by the server. Moreover, because a vehicle to be used for the search is selected appropriately based on the position of the vehicle in the defined search area, the search can be conducted efficiently.

According to the first embodiment, the vehicle detects a candidate based on information acquired from the camera for example, and the final recognition and identification of the protection target are performed by the server. The identification of the protection target requires an analysis by means of big data for example, or requires a check against many pieces of registered data. This processing can be performed by the server with a high throughput to thereby improve the accuracy in recognition and identification of the protection target.

Second Embodiment

The above description of the first embodiment relates to an example in which the recognition and identification of a protection target are performed by the server. As described above, the server stores a large amount of information. In addition, a controller with a high throughput is used for the server. The server can therefore make determinations with higher accuracy for the recognition and identification of a protection target.

If the number of vehicles used for conducting a search for a target person increases, the total amount of information transmitted and received to/from the vehicles and the server increases, which may result in increase of the time taken for communication and/or increase of the processing load on the server.

Regarding a second embodiment, a scheme is described according to which a specific part or the whole of the recognition and identification of a protection target is performed by the controller in the vehicle so as to reduce the amount of communication between the vehicles and the server and reduce the processing load on the server.

Figure 4:
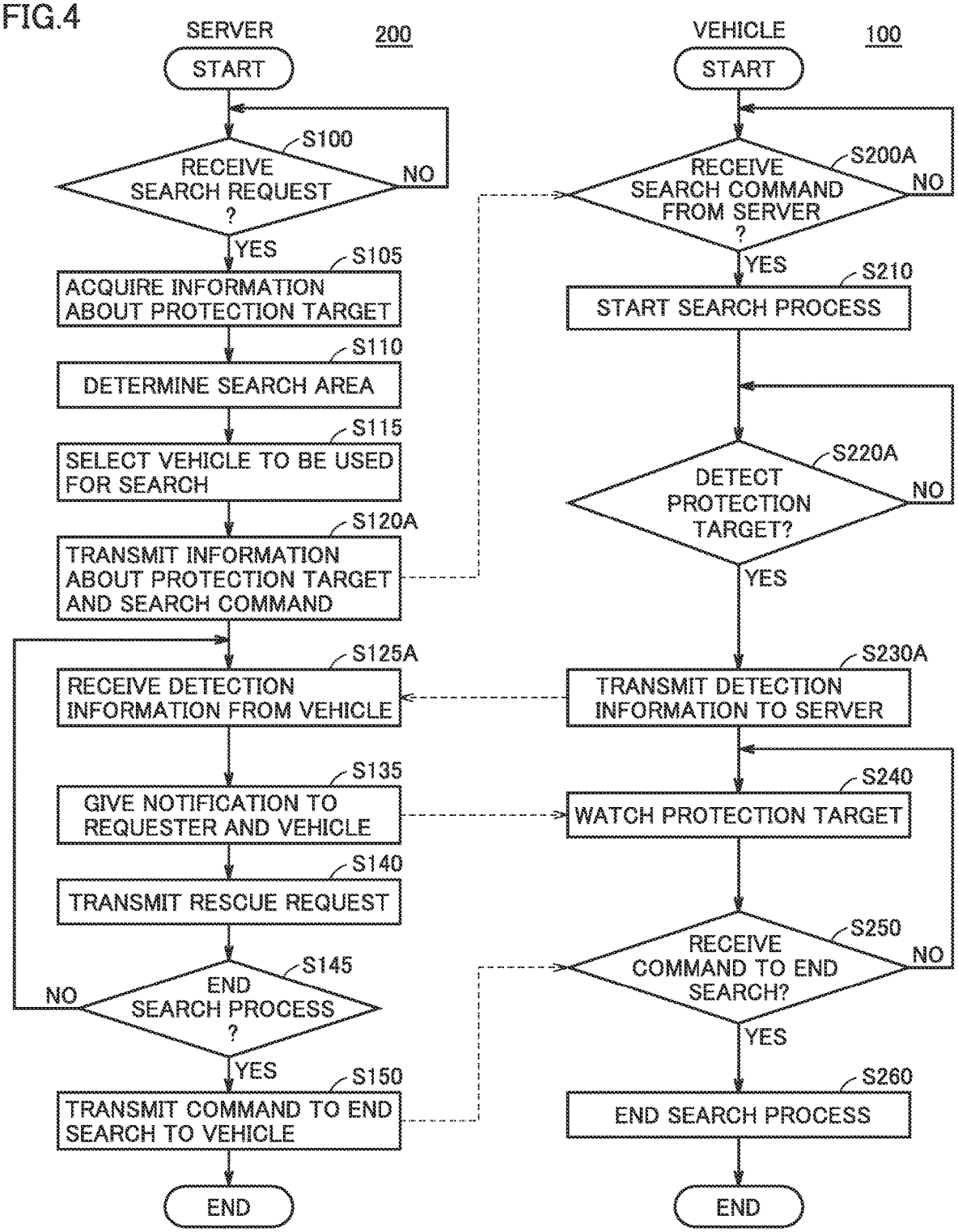
FIG. 4 is a flowchart for illustrating details of control executed by a vehicle and a server for a rescue system according to a second embodiment.

FIG. 4 is a flowchart for illustrating details of control executed by vehicle 100 and server 200 of rescue system 10 according to the second embodiment. Steps S120, S125, S200, S220, and S230 of the flowchart in FIG. 3 are replaced with S120A, S125A, S200A, S220A, and S230A, respectively, in FIG. 4, and FIG. 4 does not include step S130 of FIG. 3. The description of those steps in FIG. 4 which are also included in FIG. 3 is not repeated.

Referring to FIG. 4, server 200 selects a vehicle to be used for conducting the search in S115, and then transmits to selected vehicle 100 information for identifying the protection target, together with a command to search in S120A.

Receiving, in S200A, the command to search and the information about a protection target transmitted from server 200, vehicle 100 starts the search for the protection target, following the command to search (S210). Then, in S220A, based on the information received from server 200 for identifying the protection target, vehicle 100 identifies the protection target, from the information acquired by camera 110 or sensor 120.

The throughput of the controller and the storage capacity of the storage device mounted on vehicle 100 are commonly inferior to those of server 200. Therefore, the process for identifying the protection target that is performed by vehicle 100 is preferably limited to a scheme that enables the process to be performed with a relatively low processing load, rather than a scheme which requires a high throughput like use of big data, for example. For example, the process for reading ID information by sensor 120 or the process for extracting text information from images captured by camera 110, for example, so as to identify the person to be protected, are examples of the process that is executable by vehicle 100.

When vehicle 100 has identified the protection target, vehicle 100 transmits to server 200 detection information of the protection target. When server 200 performs a part of the process for identifying the protection target, vehicle 100 additionally transmits, in S230A, information necessary for the process to be performed by server 200.

Receiving from vehicle 100 the detection information of the protection target (S125A), server 200 gives the requester a notification that the protection target has been found (S135), and makes a rescue request to rescue group 400 to rescue the protection target, based on the detection information (S140). Although not shown in FIG. 4, when server 200 also performs a part of the process for identifying the protection target, server 200 performs an operation corresponding to step S130 in FIG. 3.

Control performed in accordance with the process as described above enables the vehicle to execute at least a part of the recognition and identification of the protection target. Accordingly, the protection target can be searched for efficiently with a reduced amount of communication between the vehicle and the server and a reduced processing load on the server.

Third Embodiment

According to the first and second embodiments, the finding of the protection target is always followed by a rescue request given to a rescue group. In some cases, the protection target may perform an ordinary activity such as walking or shopping, for example. If the request to rescue is given to the rescue group in such a case as well, an unnecessary call-out may be made to a person in charge, for example, which leads to inefficiency.

Regarding a third embodiment, a description is given of the features that a protection level for the detected protection target is determined depending on the situation or condition of the protection target at the time of detection, and whether to make a request to rescue is determined based on the protection level. More specifically, server 200 determines, by action determination unit 214 in FIG. 2, the protection level for the protection target, based on information from vehicle 100, and determines an action to be executed, based on a comparison between the protection level and standards stored in storage unit 220.

The protection level is determined based on at least one of the location where the protection target was detected, the time when the protection target was detected, the weather when the protection target was detected, and the condition of the protection target, for example. More specifically, as to the location where the protection target was detected, the protection level is determined based on the distance from a location of heavy traffic, or from a location where accidents are more likely to occur such as river and pond. As to the time when the protection target was detected, the protection level is determined based on whether it was daytime, nighttime, or midnight, for example. As to the weather when the protection target was detected, the protection level is determined based on rainfall, snowfall, wind velocity, and issuance of weather warning or alert, for example. As to the behavioral patterns of the protection target, the protection level is determined based on whether the manner of walking is that of a drunken person and/or any characteristic habit of the protection target, for example. The protection level may be determined in accordance with an instruction from a protector when contact is made with the protector.

Figure 5:
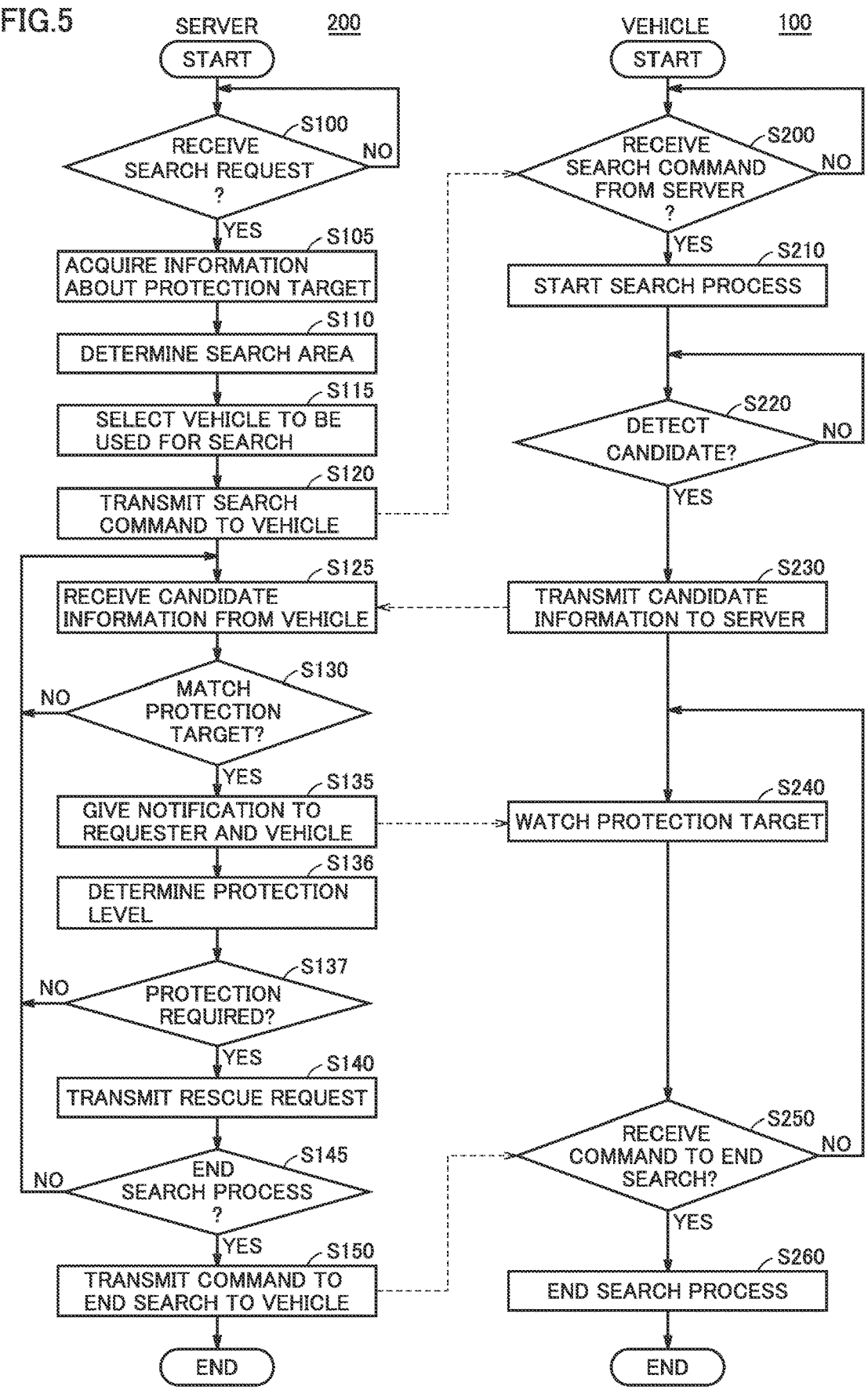
FIG. 5 is a flowchart for illustrating details of control executed by a vehicle and a server for a rescue system according to a third embodiment.

FIG. 5 is a flowchart for illustrating details of control executed by vehicle 100 and server 200 of rescue system 10 according to the third embodiment. FIG. 5 includes steps S136 and S137 in addition to the steps of the flowchart in FIG. 3. The description of those steps in FIG. 5 which are also included in FIG. 3 is not repeated.

Referring to FIG. 5, server 200 identifies the protection target, based on information from vehicle 100 (S130), provides the requester and vehicle 100 with a notification that the protection target has been identified (S135), and determines the protection level (S136) based on the environment and the condition of the protection target, at the time when the protection target was detected, which is derived from the information given from vehicle 100. If the protection target is in an environment where the possibility that the protection target encounters danger is high, the protection level is set to a high level. When the found protection target is down or performs a strange behavior as well, the protection level is set to a high level. The protection level is determined based on a combination of multiple conditions as described above, and set to one of five levels, for example.

After the protection level is determined, server 200 compares the determined protection level with a preset threshold value to determine whether it is necessary to protect (rescue) the protection target in S137. When the protection level is set to one of five levels, it is determined that rescue of the protection target is necessary when the protection level is "4" or higher, for example.

When rescue is necessary (YES in S137), the process proceeds to S140 in which a request to rescue is transmitted to rescue group 400. When rescue is not necessary (NO in S137), the process proceeds to S125 and server 200 continues the search and watching of the protection target.

Under control performed in accordance with the process as described above, it is determined whether to request the rescue group to rescue the protection target, based on the environment and/or the condition of the protection target when the protection target was detected. Accordingly, an inappropriate rescue request to the rescue group or unnecessary call-out to a person in charge can be prevented.

Fourth Embodiment

According to the above description of the first to third embodiments, a search is started in response to a request, from a requester, to search for a specific protection target.

Regarding a fourth embodiment, a scheme is described according to which when a running or stopping vehicle detects a possible candidate, the vehicle detecting the candidate voluntarily makes an inquiry to the server, even when a search request has not been given from a requester.

Figure 6:
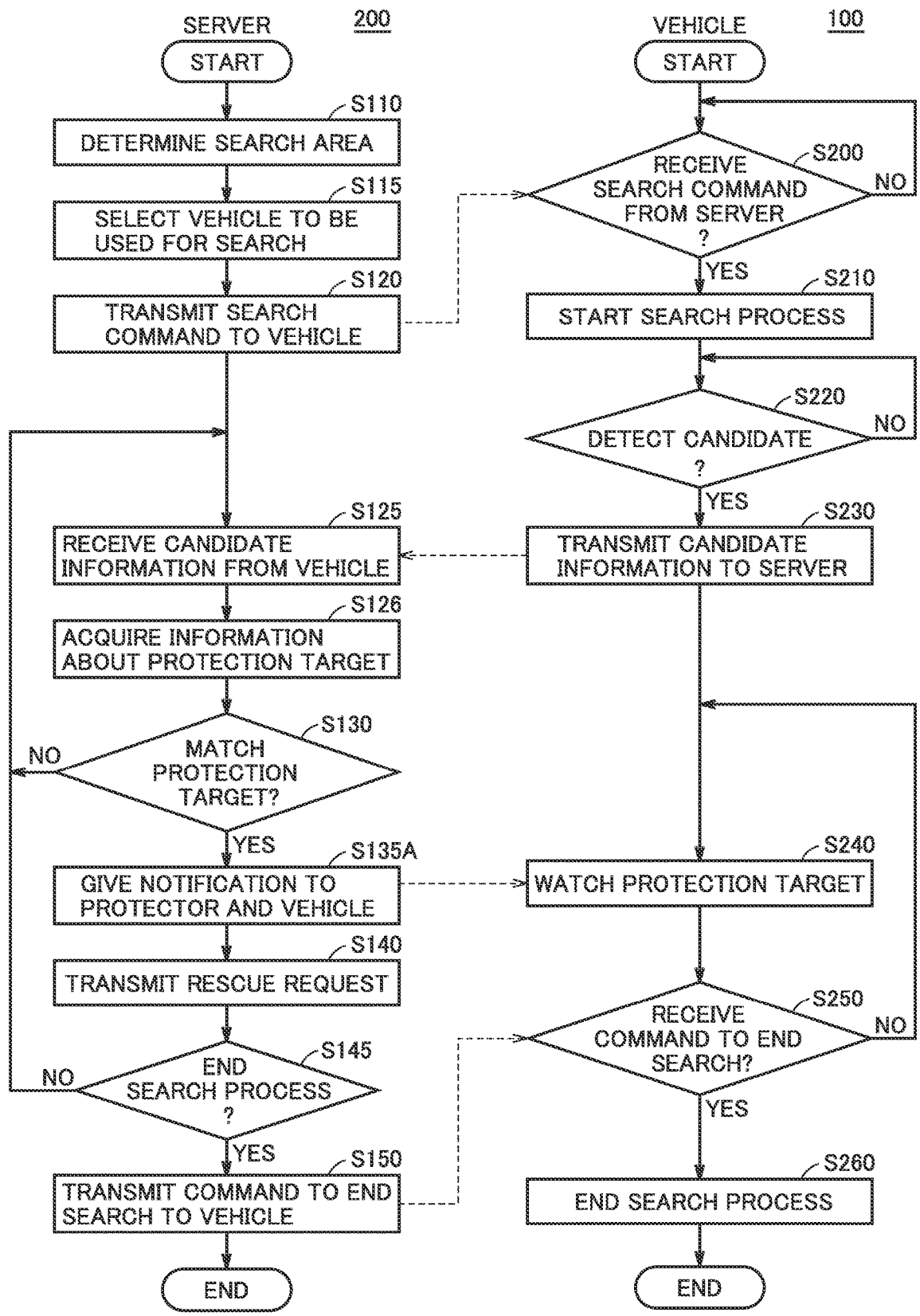
FIG. 6 is a flowchart for illustrating details of control executed by a vehicle and a server for a rescue system according to a fourth embodiment.

FIG. 6 is a flowchart for illustrating details of control executed by vehicle 100 and server 200 of rescue system 10 according to the fourth embodiment. In FIG. 6, steps S100 and S105 of the flowchart in FIG. 3 are not included, step S126 is additionally included, and S135 in FIG. 3 is replaced with S135A. The description of those steps in FIG. 6 which are also included in FIG. 3 is not repeated.

Referring to FIG. 6, in order to conduct patrol to find whether a person who needs protection is present or not, even when no search request has been given from a requester, server 200 appropriately selects a vehicle located within a specific search area and outputs a command to search (S110-S120). Receiving the command to search from server 200, vehicle 100 detects a candidate to be protected, based on information acquired from camera 110 and sensor 120, and transmits to server 200 the detection information that the candidate has been detected (S200-S230).

Receiving the detection information from vehicle 100 (S125), server 200 acquires from storage unit 220 information about a registered protection target (S126). In S130, server 200 checks the detection information from vehicle 100 against the registered information from storage unit 220 to determine whether the candidate detected by vehicle 100 is the protection target who is registered in advance. When the candidate is the protection target (YES in S130), server 200 gives a notification to a protector of the protection target (S135A) and makes a rescue request to rescue group 400 as required.

Under control performed in accordance with the process as described above, a vehicle located in a predetermined area conducts patrol to find whether a protection target is present or not, even when no search request has been given from a requester. For example, even when a protector of a protection target who is registered in advance is not aware of the fact that the protection target is absent without leave, the protection target can be found in an early stage and occurrence of an accident can be prevented.

The above-described first to fourth embodiments may be combined as appropriate within the range that causes no inconsistency.

[Modifications]

According to the above description of each embodiment, a vehicle is used as movable body 100. Movable body 100, however, may represent a concept including human or animal. For example, as the camera mounted on the movable body in the above description, a mobile terminal (smart phone or the like) having the photography function or a wearable camera which is wearable on a human/animal body may also be used. If the movable body is a human, the movable body is not limited to those who are experts in search, but images taken by an ordinary person who is taking a stroll, jogging, or walking may be transmitted to server 200.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rescue system for identifying and rescuing a protection target, using information from a detection device, the rescue system comprising: a plurality of movable bodies each equipped with the detection device; and a server configured to communicate with the plurality of movable bodies, the server being configured to define a search area to be searched for the protection target, acquire positional information about the plurality of movable bodies and select, from movable bodies located within the search area, at least one movable body a selected movable body, output, to the selected movable body, a command for causing the selected movable body to transmit information to the server, and change the selected movable body used for searching for the protection target, when the currently-selected movable body moves to go out from the search area and a new movable body enters the search area, wherein the protection target is a person.

2. The rescue system according to claim 1, wherein
when receiving the command, the selected movable body is configured to transmit to the server information acquired from the detection device, and
the server is configured to identify the protection target, based on the information transmitted from the selected movable body.

3. The rescue system according to claim 2, wherein
the detection device is a camera, and
the server is configured to identify the protection target, using an image captured by the camera and transmitted from the selected movable body.

4. The rescue system according to claim 3, wherein
the server is configured to identify, using a characteristic of a candidate included in the image captured by the camera, the candidate as the protection target, and
the characteristic includes text information about the candidate, and clothing, belonging, and behavioral pattern of the candidate.

5. The rescue system according to claim 2, wherein
the protection target has a belonging with ID information,
the detection device is a sensor configured to read the ID information, and
the server is configured to identify the protection target using the ID information transmitted from the selected movable body.

6. The rescue system according to claim 1, wherein
the server is configured to transmit to the selected movable body information for identifying the protection target, and
the selected movable body is configured to compare information acquired from the detection device with the information transmitted from the server to identify the protection target, and transmit, to the server, detection information of the protection target.

7. The rescue system according to claim 2, wherein
search for the protection target is performed in response to a request from a requester, and
when the protection target is identified, the server is configured to provide the requester with a notification that the protection target has been found.

8. The rescue system according to claim 2, wherein
when the protection target is identified, the server is configured to output, to the selected movable body, a command to watch the protection target.

9. The rescue system according to claim 2, wherein the server is configured to determine a protection level for the protection target, using information from the selected movable body, when the protection level is larger than a threshold value, the server is configured to make a rescue request to a rescue group, and the protection level is determined in accordance with at least one of a location where the protection target is detected, a time when the protection target is detected, weather when the protection target is detected, and a condition of the protection target when the protection target is detected.

10. The rescue system according to claim 2, wherein when a location where the protection target is detected is out of a predetermined range, the server is configured to make a rescue request to a rescue group, wherein the predetermined range is a usual activity area of the protection target.

11. The rescue system according to claim 2, wherein when the server makes a rescue request to a rescue group, the server is configured to provide the rescue group with a notification of positional information about the protection target, and in response to the rescue request from the server, the rescue group dispatches a person in charge to a location indicated by the positional information.

12. The rescue system according to claim 7, wherein
when the requester makes a request to rescue after receiving the notification, the server is configured to make a rescue request, to a rescue group, to rescue the protection target.

13. The rescue system according to claim 2, wherein
when the protection target is identified, the server is configured to make a rescue request, to a rescue group, to rescue the protection target.

14. The rescue system according to claim 1, wherein
when the selected movable body moves to go out of the search area, the server is configured to output the command to another movable body in the plurality of movable bodies located within the search area.

15. A server used for a rescue system for identifying and rescuing a protection target, using information from a detection device, the server being configured to communicate with a plurality of movable bodies each equipped with the detection device, the server being configured to define a search area to be searched for the protection target, acquire positional information about the plurality of movable bodies and select, from movable bodies located within the search area, at least one movable body as a selected movable body, output, to the selected movable body, a command for causing the selected movable body to transmit information to the server, and change the selected movable body used for searching for the protection target, when the currently-selected movable body moves to go out from the search area and a new movable body enters the search area, wherein the protection target is a person.

16. A rescue method for identifying and rescuing a protection target, using information from a detection device in a system, the system comprising: a plurality of movable bodies each equipped with the detection device; and a server configured to communicate with the plurality of movable bodies, the rescue method comprising, by the server: defining a search area to be searched for the protection target; acquiring positional information about the plurality of movable bodies; selecting, from movable bodies located within the search area, at least one movable body a selected movable body; outputting, to the selected movable body, a command for causing the selected movable body to transmit information to the server; and changing the selected movable body used for searching for the protection target, when the currently-selected movable body moves to go out from the search area and a new movable body enters the search area, wherein the protection target is a person.

* * * * *